United States Patent
Pacheco et al.

(10) Patent No.: US 6,983,096 B2
(45) Date of Patent: Jan. 3, 2006

(54) ATTENUATION OF CLADDING MODES IN OPTICAL FIBERS

(75) Inventors: Mario Pacheco, Fremont, CA (US); Marc A. Finot, Palo Alto, CA (US); Jayakumar Gurusamy, Newark, CA (US)

(73) Assignee: Intel Corporation, Santa Clara, CA (US)

(*) Notice: Subject to any disclaimer, the term of this patent is extended or adjusted under 35 U.S.C. 154(b) by 334 days.

(21) Appl. No.: 10/414,379

(22) Filed: Apr. 15, 2003

(65) Prior Publication Data

US 2004/0208437 A1    Oct. 21, 2004

(51) Int. Cl.
  *G02B 6/00*    (2006.01)

(52) U.S. Cl. ................ 385/140; 385/136; 385/137; 250/227.16

(58) Field of Classification Search .......... 385/37, 385/62, 81, 130, 137, 140; 250/227.14, 227.16; 73/800; 166/255.1
See application file for complete search history.

(56) References Cited

U.S. PATENT DOCUMENTS

| | | | |
|---|---|---|---|
| 4,342,907 A * | 8/1982 | Macedo et al. ........ 250/227.14 |
| 4,443,700 A * | 4/1984 | Macedo et al. ........ 250/227.16 |
| 4,459,477 A * | 7/1984 | Asawa et al. .......... 250/227.16 |
| 4,477,725 A * | 10/1984 | Asawa et al. .......... 250/227.16 |
| 4,711,525 A | 12/1987 | Feth |
| 4,749,246 A * | 6/1988 | Epworth et al. ............ 385/13 |
| 4,932,262 A * | 6/1990 | Wlodarczyk ................ 73/705 |
| 5,020,379 A * | 6/1991 | Berthold et al. ............ 73/800 |
| 5,195,162 A * | 3/1993 | Sultan et al. .............. 385/130 |
| 5,258,614 A * | 11/1993 | Kidwell et al. ........ 250/227.16 |
| 5,818,982 A | 10/1998 | Voss et al. |
| 5,852,690 A | 12/1998 | Haggans et al. |
| 6,411,762 B1 | 6/2002 | Anthon et al. |
| 6,429,421 B1 * | 8/2002 | Meller et al. .......... 250/227.14 |
| 6,445,858 B1 | 9/2002 | Musk |
| 2002/0018635 A1 * | 2/2002 | Hsieh et al. ................ 385/137 |
| 2002/0122629 A1 * | 9/2002 | Grubsky et al. ............. 385/37 |
| 2003/0002794 A1 * | 1/2003 | Ramachandran ............ 385/37 |
| 2004/0163809 A1 * | 8/2004 | Mayeu et al. ............ 166/255.1 |

* cited by examiner

*Primary Examiner*—Brian Healy
*Assistant Examiner*—Mary El-Shammaa
(74) *Attorney, Agent, or Firm*—Marshall, Gerstein & Borun LLP

(57) ABSTRACT

A device for attenuating cladding modes in a single mode optical fiber is disclosed. The device comprises two supports, each equipped with spaced apart corrugations. The optical fiber lies transversely across the corrugations and the two supports are clamped together to impart micro-bends to the optical fiber. The resulting micro-bends provide excellent cladding mode attenuation and the spacing of the corrugations and support members can be adjusted so that the core modes are not attenuated.

15 Claims, 4 Drawing Sheets

ATTENUATION OF CLADDING MODES IN OPTICAL FIBERS

TECHNICAL FIELD

A device for attenuating cladding modes in short optical fibers is disclosed. More specifically, the cladding mode attenuator disclosed herein can be used in pigtailed optical modules having short optical fiber lengths. The device can be used to modify short single mode or multiple-mode optical fibers to scramble the cladding modes therein or the device can form a part of a transmitter module assembly.

BACKGROUND OF THE RELATED ART

In the manufacturing of pigtailed optical transmitters, it is desirable to use short fibers for packaging and handling purposes. The actual length of the optical fiber of a pigtailed optical transmitter is determined primarily by the minimum required length for the fusion-splicing process because the optical fiber is fusion-spliced at the end of the manufacturing process of the optical transmitter in order to match its fiber length specification. Thus, from a mechanical point of view, the minimum length of an optical fiber of a pigtailed optical transmitter that can be used in its manufacturing process is limited by the fusion-splicing process.

Relatively short optical fiber, i.e., about fifty centimeters or less, carry a high level of light traveling through the cladding, or cladding modes. The cladding modes artificially increase the output light thus producing incorrect optical power measurements. This increase in output light can be attenuated by a polymer buffer layer coated onto the cladding layer which is designed to attenuate cladding modes within the length of about one meter. One example of an optical fiber with such a polymer buffer layer is the SMF-28 optical fiber, which has become somewhat of a standard in certain communication industries.

However, cladding modes in pigtailed optical transmitters or other optical modules are particularly problematic because both the core and cladding modes for a given stub fiber length are strongly dependent upon the launch condition, or how the light is coupled to the fiber. More specifically, the core:cladding modes ratio for a given stub fiber length depends upon the launch condition. Since the launch condition can differ from one module to another, the power output of a module having a given stub fiber length cannot be correlated to the output power of that module once the fiber has been fusion spliced; in other words, the correlation between optical power with cladding modes and cladding modes free is weak.

Another problem associated with the cladding modes of short optical fibers is the fact that bending the fiber can promote the escape of light from the cladding to the polymer buffer which makes the output power sensitive to mechanical vibrations thereby adversely affecting the repeatability of the optical power measurements.

In summary, attenuation of cladding modes can be very advantageous, particularly, in short single mode fibers of pigtailed optical modules. Various attenuation techniques have been tried, with limited success.

Specifically, two techniques for filtering or attenuating cladding modes include bending the fiber around a cylindrical mandrel and external spatial filtering. In the case of bending the fiber around a mandrel, the minimum length of the fiber depends upon the wavelength and the launch conditions. Consequently, the minimum length is larger than 30 centimeters thereby limiting the effectiveness of using a cylindrical mandrel to filter the cladding modes. In the case of external spatial filtering, this technique requires the use of a pinhole in front of the optical power meter to allow only the core radiation to be detected. This technique is not practical when bare fibers are employed.

Other techniques involve stripping the cladding mode using a lossy jacket or polymer buffer coated onto the outside of the cladding or other special fiber optic techniques. One example of a polymer buffer, again, is found in the SMF-28 optical fiber. However, the length of the fiber must be at least one meter in order for the polymer buffer to be effective thereby essentially not permitting this technique to be used in optical modules having short fiber lengths. Other mode stripping techniques include use of the combination of single mode, multi mode and single mode optical fibers fusion-spliced in a series. The cladding modes are stripped as they pass through the multi-mode/single mode interfaces. Still other modes tripping techniques include the use of refraction index gel or epoxy, double cladding or depressed cladding. Resort to these types of claddings result in a fiber that is substantially more expensive than the standard SMF-28 fiber.

Therefore, there is a need for a cladding mode attenuation device and method which will affectively attenuate cladding modes in short single mode stub optical fibers, without altering the core radiation, which can then be used in pigtailed optical modules.

BRIEF DESCRIPTION OF THE DRAWINGS

The disclosed methods and devices are illustrated more or less diagrammatically in the accompanying drawings, wherein.

The disclosed embodiments have been described with diagrammatic representations and fragmentary views. In certain instances, details which are not necessary for an understanding of the disclosed attenuation devices and methods or which render other details difficult to perceive may have been omitted. It will also be noted that this disclosure is not limited to the particular embodiments disclosed herein.

DETAILED DESCRIPTION OF THE PRESENTLY PREFERRED EMBODIMENTS

As noted above, SMF-28 fiber is a "standard" optical fiber for telephony, cable television, and private network applications and the transmission of data, voice and/or video services. SMF-28 is manufactured by Corning, Inc. of Corning, N.Y. SMF-28 includes three principle components illustrated in FIG. 1. Those components of such a fiber 10 include a core 11, a cladding 12 and a polymer buffer coating shown in phantom at 13. The diameter of the buffer coating 13 is approximately 245 μm.

Figure 1:
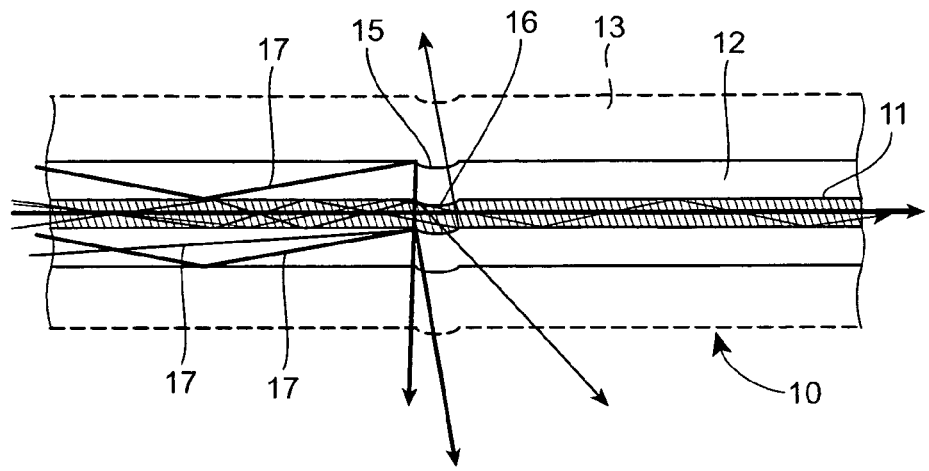
FIG. 1 is a partial sectional view of an optical fiber with a micro-bend therein which illustrates the attenuating affect of a micro-bend in an optical fiber on cladding modes.

FIG. 1 also introduces the concept of micro-bending. Micro-bending is a technique used in this disclosure to attenuate cladding modes in a fiber like one shown at 10 in FIG. 1. However, by imparting a micro-bend 15 and 16 into the cladding 12 and core 11 respectively, the cladding modes shown at 17 can be attenuated by the bends 15, 16 in the cladding 12 and core 11. This concept of using a micro-bend to attenuate cladding modes is further expanded by using an attenuation device such as that shown at 20 in FIGS. 2–5.

Figure 2:
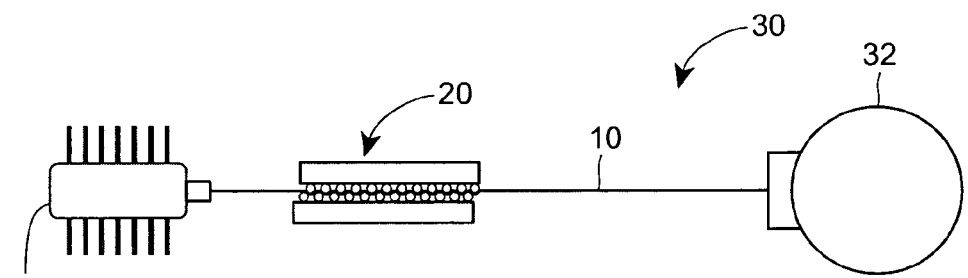
FIG. 2 is a schematic illustration of a transmitter module that includes a laser diode linked to a detector by an optical fiber equipped with an attenuation device for purposes of attenuating cladding modes in the fiber in accordance with this disclosure.

More specifically, referring to FIG. 2, a transmitter module 30 is disclosed which includes a laser diode 31 linked to a detector 32 by a standard optical fiber 10. The fiber 10 is a short, pigtailed fiber and therefore is prone to cladding modes. To attenuate the cladding modes, the attenuation device 20 is installed, either permanently or temporarily, between the laser diode 31 and detector 32.

Figure 3:
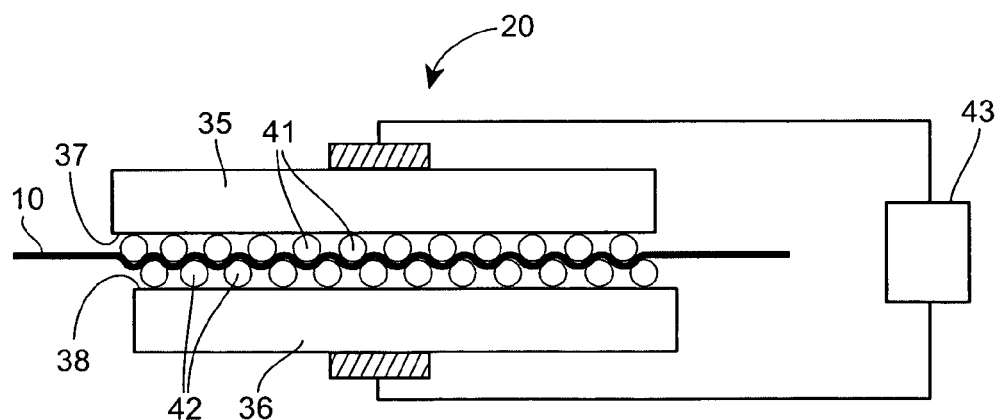
FIG. 3 is an enlarged side view of the attenuation device and fiber disclosed in FIG. 2.

Turning to FIG. 3, the attenuating device 20 includes a first support member 35 and a second support member 36. Each support member 35, 36 include an inner face 37, 38 respectively. Each inner face 37, 38 either comprises or is connected to a plurality of corrugations shown generally at 41 for the first support member 35 and at 42 for the second support member 36. To impart a plurality of micro-bends to the fiber 10, the fiber 10 is placed transversely across the corrugations 41, 42 and the support members 35, 36 are pressed together as shown in FIG. 3. A clamping mechanism 43 may be employed to move the support members 35, 36 together and to achieve the correct spacing between the corrugations 41, 42 as explained below.

Figure 4:
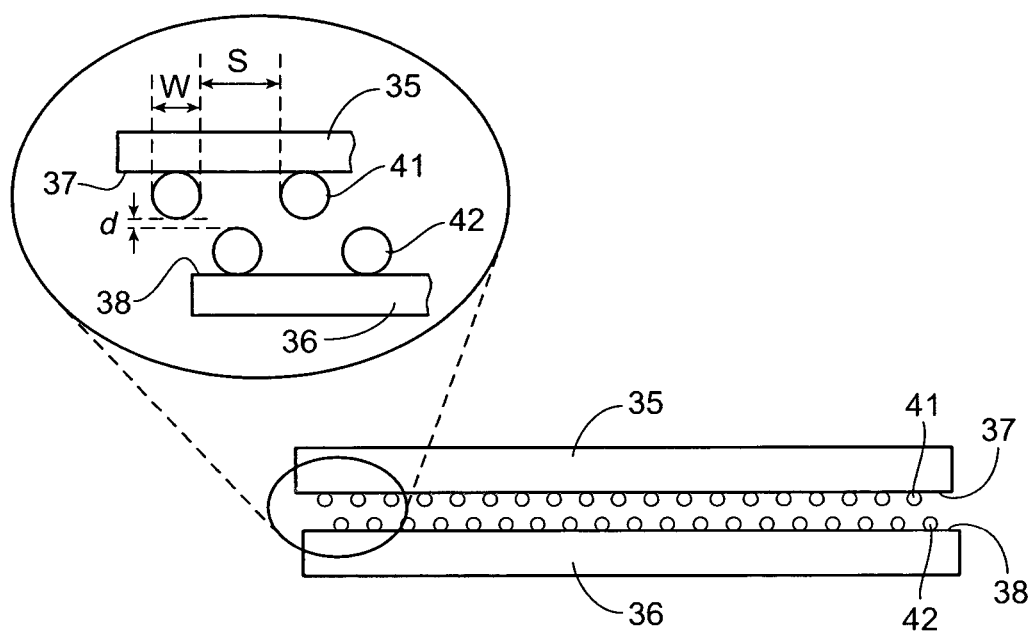
FIG. 4 is an enlarged side view of an attenuation device in accordance with this disclosure with an additional enlarged view illustrating the spacial relationship between the two opposing support members and the corrugations mounted on the inner surfaces thereof.
Figure 5:
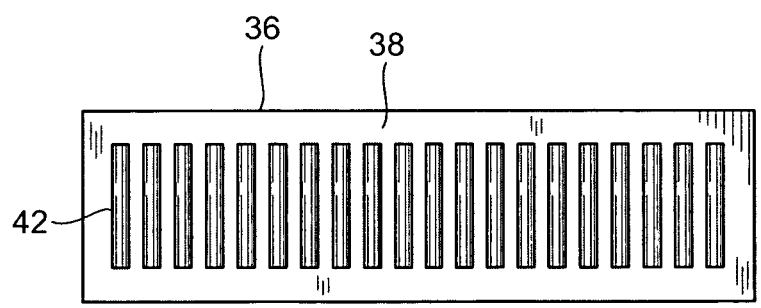
FIG. 5 is a plan view of one of the support members of the attenuation device illustrated in FIG. 4.

Specifically, as shown in FIG. 4, the support members 35, 36 and corrugations 41, 42 are spaced apart by a distance or spacing d. Further, the corrugations have a width or diameter w and the corrugations on either support member 35, 36 are spaced apart by a distance or spacing s. A plan view of one of the support members 36 is shown in FIG. 5.

Five attenuating devices with twenty corrugations (N) on each support member 41, 42 and with spacings S between the corrugations ranging from 1.1 mm to 1.8 mm were constructed. The clamping and metering mechanism 43 permits the spacing d between confronting or facing corrugations 41, 42 to range from 0 to 240 μm. Each device includes 20 correlations 41, 42 on each support member 35, 36 respectively. A summary of the five scramblers or attenuators (Scr) is presented in Table I.

TABLE I

| Scr # | W | N | S | d |
|---|---|---|---|---|
| 1 | 1 mm | 20 | 1.1 mm | 0–240 μm |
| 2 | 1 mm | 20 | 1.2 mm | 0–240 μm |
| 3 | 1 mm | 20 | 1.3 mm | 0–240 μm |
| 4 | 1.5 mm | 20 | 1.7 mm | 0–240 μm |
| 5 | 1.5 mm | 20 | 1.8 mm | 0–240 μm |

The five scramblers illustrated in Table I were tested as follows. Specifically, each optical module tested had an original length of 90 cm. The fiber was bent around a 30 mm diameter mandrel to assure a cladding modes free condition in the target optical power. The fiber was then cut back to a shorter fiber length of about 20 cm. One of the scramblers shown in Table I was then installed to impart micro-bends to the fiber with a separation (d) between blocks of 144 μm. The 144 μm separation was chosen because of the outer diameter of a SMF-28 fiber of about 245 μm thereby ensuring good micro-bending of the fiber but little risk of damage to the core and cladding.

The optical power measurements were repeated five times for each scrambler as well as for the original 90 cm fiber, the 90 cm fiber bent around the 30 mm mandrel and the shortened 20 cm fiber. Each scrambler 20 was tested with a spacing d of 144 μm. Using the 90 cm fiber bent around the 30 mm mandrel as the target optical power, the optical power measurements were made and the mean differences between the target optical power and the measured optical power for the (A) 90 cm fiber, (B) 90 cm fiber bent around the 30 mm mandrel, (C) 20 cm fiber and (D)–(H) 20 cm fiber equipped with scrambler numbers 1 through 5 are recorded along with the standard deviation, standard error mean and upper and lower 95 percentile measurements are recorded in Table II. Five data points were recorded for each apparatus (n=5).

TABLE II

| Level | n | Mean (dB) | Std Dev | Std Err Mean | Lower 95% | Upper 95% |
|---|---|---|---|---|---|---|
| (A) 90 cm | 5 | 1.4429 | 1.08166 | 0.48373 | 0.0999 | 2.7860 |
| (B) 90 cm + Bend | 5 | 0.0000 | 0.00000 | 0.00000 | 0.0000 | 0.0000 |
| (C) 20 cm | 5 | 1.9684 | 1.13281 | 0.50661 | 0.5619 | 3.3750 |
| (D) 20 cm + Scr 1 | 5 | 0.1744 | 0.27215 | 0.12171 | −0.1636 | 0.5123 |
| (E) 20 cm + Scr 2 | 5 | 0.1536 | 0.19104 | 0.08544 | −0.0836 | 0.3908 |
| (F) 20 cm + Scr 3 | 5 | 0.0404 | 0.14506 | 0.06487 | −0.1397 | 0.2205 |
| (G) 20 cm + Scr 4 | 5 | 0.2904 | 0.14814 | 0.06625 | 0.1065 | 0.4744 |
| (H) 20 cm + Scr 5 | 5 | −0.0031 | 0.20756 | 0.09282 | −0.2608 | 0.2547 |

Figure 6:
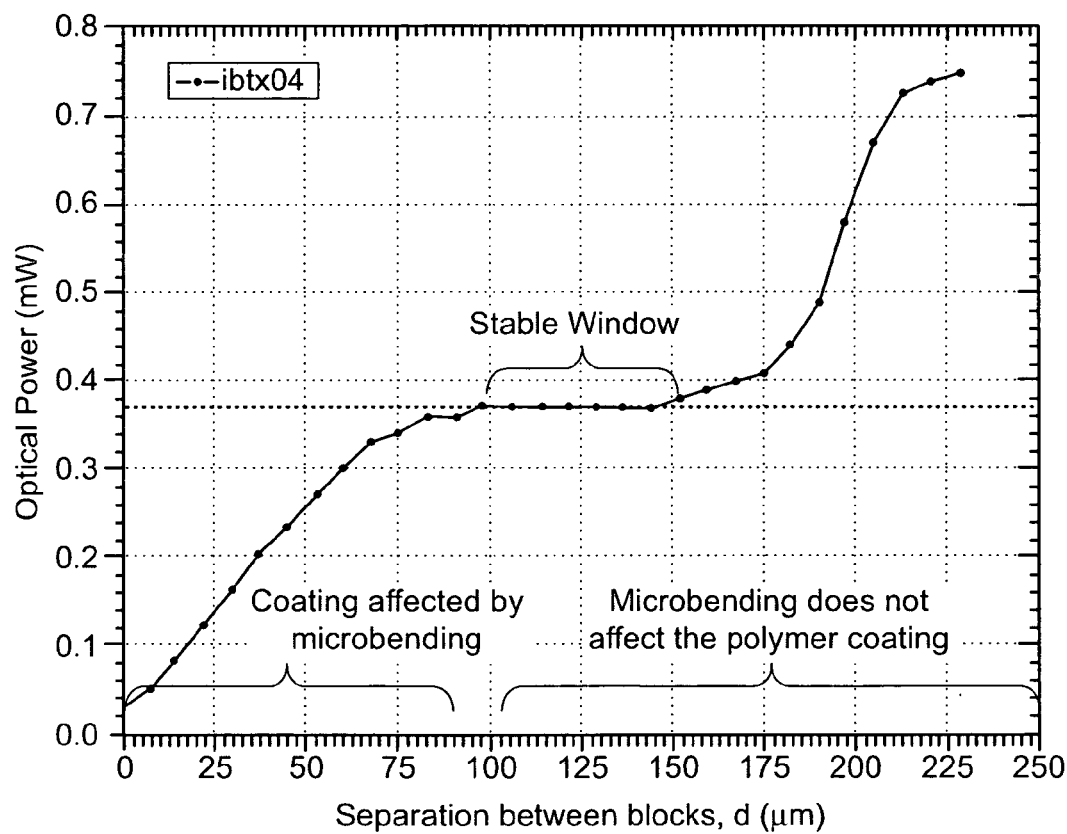
FIG. 6 illustrates, graphically, the relationship between the separation between the opposing corrugations of the disclosed attenuation device and the attenuating affect for a SMF-28 optical fiber with a polymer buffer coating.

As shown in Table II, the scramblers numbered 3 and 5 performned the best (see entries F and H). However, all five scramblers provides significant attenuation. Referring now to FIG. 6, with respect to the spacing d between opposing corrugations 41, 42, it has been found that, for a 245 μm SMF-28 optical fiber, the spacing d of 230 μm or more does not provide sufficient contact between the fiber 10 and the corrugations 41, 42 to provide the requisite micro-bending as illustrated in FIG. 6. However, for spacings d between 150 μm and 230 μm, attenuation begins and the scrambler attenuates only light from the cladding 12. For spacings between 150 μm and 100 μm, the scrambler provides excellent attenuation for cladding light but does not begin attenuation of core light as shown toward the left in FIG. 6, for spacings below 100 μm for a SMF-28 optical fiber, the scrambler would begin attenuating core radiation. Further, for spacing below about 90 μm, the scrambler can damage the polymer coating on the SMF-28 fiber. Thus, a spacing of 100 μm or more would be preferred to avoid damage to the polymer buffer coating 13.

With respect to the number of corrugations 41, 42, it has been found that using less than about 15 corrugations on each support member 35a, 36a can attenuate cladding modes without effecting core power. However, the pressure between the support members 35a, 36a must be substantially higher, thereby affecting the polymer coating 13 of the fiber 10. Consequently, it has been found that it is preferable to use more than about 15 corrugations 41, 42 on each support member 35a, 36a and preferably about 20 corrugations 41, 42 on each support member 35a, 36a to reduce the pressure or force required between the support members 35a, 36a to achieve attenuation and thereby reduce the possibility of any adverse affects to the polymer coating 13 of the fiber 10.

Figure 7:
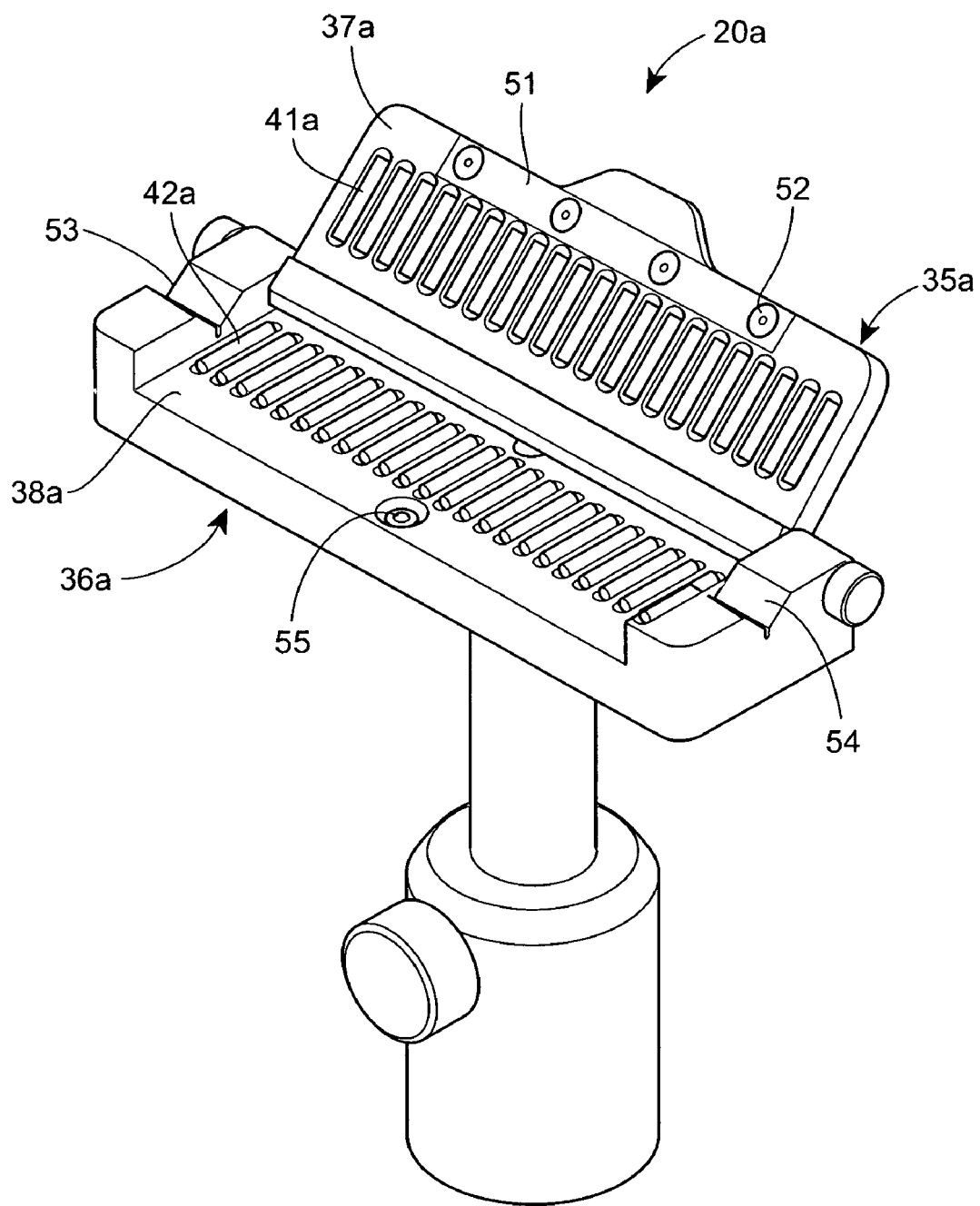
FIG. 7 is a perspective view of an attenuation device made in accordance with this disclosure which can be particularly useful for holding a fiber during a welding process while simultaneously attenuating cladding modes of the fiber.

FIG. 7 illustrates an attenuation device 20a which can also conveniently serve as a vice for holding a fiber 10 during the welding thereof. Specifically, the combination clamping/attenuation device 20a includes an upper support member 35a that is pivotally connected to a lower support member 36a. As shown in FIG. 7, a steel strip 51 is mounted to the upper support member 35a with a plurality of fasteners 52. A magnet (not shown) may be embedded in the lower support member 36a to facilitate the use of the device 20a as a clamping or holding device during a welding or other manufacturing process.

The interfaces 37a, 38a of the support members 35a, 36a each include 20 corrugations 41a, 42a respectively for the reason set forth above. The lower support member 36a also includes channels 53, 54 for accommodating an optical fiber 10 (not shown). One or more fine thread adjuster shown at 55 can be used to calibrate and set the spacing d between opposing corrugations 41a, 42a. Adjusting the position of the magnet with respect to the steel strip 51 provides a convenient mechanism for adjusting the pressure between the upper support member 35a and lower support member 36a. Other mechanisms for increasing or decreasing pressure between the opposing support members 35a, 36a will be apparent to those skilled in the art.

In use, a fiber 10 is aligned with a front end of a laser diode 31. During this alignment process, optical powers transmitted through the fiber 10 is monitored using an optical power meter at a distal end of the fiber 10. During this process, the device 20a can be used to hold the fiber 10 in place. Once the optical output power has been measured, the cladding modes of the fiber may be attenuated using the device 10 and the methods described above.

The devices 20 and 20a and the methods of use thereof are applicable to pigtailed optical modules for producing a simple and repeatable method for removing cladding modes in short single mode optical fibers. The devices and methods disclosed herein are suitable for any application where an optical power measurement from a stub-pigtail optical module is required. Further, the devices and methods disclosed herein can be used to remove cladding modes without affecting core radiation in any application where short single mode fibers are used.

While only certain embodiments have been set forth, alternative embodiments and various modifications will be apparent from the above description to those skilled in the art. These and other alternatives are considered equivalents and within the spirit and scope of this disclosure.

What is claimed is:

1. An apparatus for attenuating cladding modes in an optical fiber comprising:
    a first support comprising a plurality of parallel, spaced-apart corrugations;
    a second support comprising a plurality of parallel, spaced-apart corrugations, the second support facing the first support;
    the corrugations of the first and second supports having round cross sections with diameters ranging from about 0.5 mm to about 2 mm and the corrugations of the first and second supports are spaced apart by a distance ranging from about 0.75 mm to about 2.5 mm;
    the corrugations of the second support being parallel with the corrugations of the first support but offset from the corrugations of the first support so that central axes of the corrugations of the second support are disposed laterally between central axes of the corrugations of the first support; and
    a clamping mechanism for moving at least one of the first or second supports toward the other with a fiber lying transversely across the corrugations of the first and second supports to enable the corrugations of the first and second supports to impart a plurality of micro-bends into the optical fiber.

2. The apparatus of claim 1 wherein the inner surface of the second support is connected to at least one outer corrugation with an axis aligned laterally outside of the axes of the corrugations of the first support.

3. The apparatus of claim 1 wherein the clamping mechanism moves the at least one of the first and second supports so that a plane defined by a tangent of each corrugation of the first support closest to the corrugations of the second support is spaced apart from a plane defined by a tangent of each corrugation of the second support closest to the corrugations of the first support by a distance ranging from about 60 $\mu$m to about 180 $\mu$m.

4. The apparatus of claim 1 wherein the number of corrugations is greater than fifteen.

5. The apparatus of claim 1 wherein the corrugations have diameters ranging from about 0.75 mm to about 1.75 mm and the distance between adjacent corrugations ranges from about 1.1 mm to about 2.3 mm.

6. The apparatus of claim 1 wherein the clamping mechanism moves the at least one of the first and second supports so that a plane defined by a tangent of each corrugation of the first support closest to the corrugations of the second support is spaced apart from a plane defined by a tangent of each corrugation of the second support closest to the corrugations of the first support by a distance ranging from about 75 $\mu$m to about 150 $\mu$m.

7. The apparatus of claim 1 wherein the corrugations have diameters ranging from about 0.75 mm to about 1.75 mm and the distance between adjacent corrugations ranges from about 1.1 mm to about 2.3 mm; and
    wherein the clamping and metering mechanism moves the at least one of the first and second supports so that a plane defined by a tangent of each corrugation of the first support closest to the corrugations of the second support is spaced apart from a plane defined by a tangent of each corrugation of the second support closest to the corrugations of the first support by a distance ranging from about 75 $\mu$m to about 150 $\mu$m.

8. An optical fiber and apparatus for attenuating cladding modes in the fiber comprising:
    a core covered by a cladding, the cladding being covered by a buffer; and
    the fiber passing through the apparatus of claim 1 and comprising a plurality of micro-bends imparted by the apparatus of claim 1.

9. The fiber of claim 8 wherein the buffer is a polymer buffer.

10. A method of attenuating cladding mode in an optical fiber and having a core covered by a cladding which is covered by a buffer, the method comprising:

placing the fiber transversely across corrugations of first and second opposing supports wherein the corrugations of the first support are parallel with the corrugations of the second support but offset from the corrugations of the second support so that central axes of the corrugations of the first support are disposed laterally between central axes of the corrugations of the second support, the corrugations of the first and second supports having round cross sections with diameters ranging from about 0.5 mm to about 2 mm and the corrugations of the first and second supports are spaced apart by a distance ranging from about 0.75 mm to about 2.5 mm;

moving the first and second supports towards each other so that a plane defined by a tangent of each corrugation of the first support closest to the corrugations of the second support is spaced apart from a plane defined by a tangent of each corrugation of the second support closest to the corrugations of the first support by a distance ranging from about 60 $\mu$m to about 180 $\mu$m to clamp the fiber between the corrugations or the supports and impart a plurality of micro-bends into the fiber.

11. The method of claim 10 wherein the inner surface of the second support is connect to at least one outer corrugation with an axis aligned laterally outside of the axes of the corrugations of the first support.

12. The method of claim 10 wherein the corrugations of the first and second supports have diameters ranging from about 0.75 mm to about 1.75 mm and the corrugations of the first and second supports are spaced apart by a distance ranging from about 1.1 mm to about 2.3 mm.

13. The method of claim 10 wherein the clamping mechanism moves the at least one of the first and second supports so that a plane defined by a tangent of each corrugation of the first support closest to the corrugations of the second support is spaced apart from a plane defined by a tangent of each corrugation of the second support closest to the corrugations of the first support by a distance ranging from about 75 $\mu$m to about 150 $\mu$m.

14. The method of claim 10 wherein the corrugations of the first and second supports have diameters ranging from about 0.75 mm to about 1.75 mm and the corrugations of the first and second supports are spaced apart by a distance ranging from about 1.1 mm to about 2.3 mm; and wherein the clamping and metering mechanism moves the at least one of the first and second supports so that a plane defined by a tangent of each corrugation of the first support closest to the corrugations of the second support is spaced apart from a plane defined by a tangent of each corrugation of the second support closest to the corrugations of the first support by a distance ranging from about 75 $\mu$m to about 150 $\mu$m.

15. A transmitter module comprising:

a laser diode fused to one end of an optical fiber and another end fused to a detector;

a middle section of the optical fiber extending transversely across an attenuation device, the attenuation device comprising a first support comprising an inner surface connected to a plurality of parallel, spaced-apart corrugations;

the corrugations of the first and second supports having round cross sections with diameters ranging from about 0.5 mm to about 2 mm and the corrugations of the first and second supports are spaced apart by a distance ranging from about 0.75 mm to about 2.5 mm:

a second support comprising an inner surface connected to a plurality of parallel, spaced-apart corrugations;

the second support being positioned so that the inner surface of the second support faces the inner surface of the first support and the corrugations of the second support are parallel with the corrugations of the first support but laterally offset from the corrugations of the first support so that central axes of the corrugations of the second support are disposed laterally between central axes of the corrugations of the first support; and wherein the first and second supports are clamped towards each other so that a plane defined by a tangent of each corrugation of the first support closest to the corrugations of the second support is spaced apart from a plane defined by a tangent of each corrugation of the second support closest to the corrugations of the first support by a distance ranging from about 60 $\mu$m to about 180 $\mu$m with the fiber disposed therebetween so that the corrugations of the first and second supports impart micro-bends into the fiber.

\* \* \* \* \*

UNITED STATES PATENT AND TRADEMARK OFFICE
CERTIFICATE OF CORRECTION

PATENT NO. : 6,983,096 B2 Page 1 of 1
APPLICATION NO. : 10/414379
DATED : January 3, 2006
INVENTOR(S) : Mario Pacheco et al.

It is certified that error appears in the above-identified patent and that said Letters Patent is hereby corrected as shown below:

Column 7, line 27: Please delete "is connect to" and insert --is connected to--.

Signed and Sealed this

Second Day of January, 2007

JON W. DUDAS
*Director of the United States Patent and Trademark Office*